United States Patent
Brownstein

(10) Patent No.: US 8,325,356 B2
(45) Date of Patent: Dec. 4, 2012

(54) METHOD OF SENDING A PHOTOGRAPH ELECTRONICALLY FROM A SELF-SERVICE DIGITAL PHOTOGRAPH PROCESSING STATION TO A REMOTE PRINTING FACILITY

(75) Inventor: Scott Brownstein, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 1261 days.

(21) Appl. No.: 11/831,159

(22) Filed: Jul. 31, 2007

(65) Prior Publication Data
US 2008/0024809 A1 Jan. 31, 2008

Related U.S. Application Data

(60) Provisional application No. 60/820,852, filed on Jul. 31, 2006.

(51) Int. Cl.
*G06F 3/12* (2006.01)
(52) U.S. Cl. ....... 358/1.15; 701/409; 701/425; 701/426; 701/431; 701/438; 701/454; 701/455; 701/482; 701/516; 701/532; 701/533
(58) Field of Classification Search .................. 358/1.15
See application file for complete search history.

(56) References Cited

U.S. PATENT DOCUMENTS

| | | | |
|---|---|---|---|
| 6,560,530 B1 * | 5/2003 | Yamada et al. ............... | 701/532 |
| 7,158,878 B2 * | 1/2007 | Rasmussen et al. .......... | 701/431 |
| 7,694,231 B2 * | 4/2010 | Kocienda et al. ............. | 715/773 |
| 2001/0019309 A1 * | 9/2001 | Saeki et al. ................... | 340/995 |
| 2002/0029226 A1 * | 3/2002 | Li et al. ....................... | 707/104.1 |
| 2002/0038337 A1 * | 3/2002 | Satomi et al. ................. | 709/203 |
| 2002/0085840 A1 * | 7/2002 | Liebenow ..................... | 396/2 |
| 2003/0002078 A1 * | 1/2003 | Toda et al. .................... | 358/1.15 |
| 2003/0093490 A1 * | 5/2003 | Yamamoto et al. ........... | 709/213 |
| 2004/0002302 A1 * | 1/2004 | Takemoto et al. ........... | 455/3.06 |
| 2004/0019521 A1 * | 1/2004 | Birmingham .................. | 705/14 |
| 2004/0103031 A1 * | 5/2004 | Weinschenk ................... | 705/14 |
| 2004/0177008 A1 * | 9/2004 | Yang .............................. | 705/26 |
| 2005/0010409 A1 * | 1/2005 | Hull et al. ..................... | 704/243 |
| 2005/0249172 A1 * | 11/2005 | Malik ............................ | 370/338 |
| 2006/0227047 A1 * | 10/2006 | Rosenberg ............... | 342/357.13 |
| 2006/0271281 A1 * | 11/2006 | Ahn et al. ..................... | 701/208 |
| 2007/0047012 A1 * | 3/2007 | Bryant ........................... | 358/403 |
| 2007/0185651 A1 * | 8/2007 | Motoyama et al. ........... | 701/211 |
| 2007/0202927 A1 * | 8/2007 | Pfleging et al. ............... | 455/567 |
| 2007/0210155 A1 * | 9/2007 | Swartz et al. ................. | 235/383 |

\* cited by examiner

*Primary Examiner* — Benjamin O Dulaney
(74) *Attorney, Agent, or Firm* — Woods Oviatt Gilman LLP

(57) ABSTRACT

A system and method for a self-service digital photograph processing station user to send data representative of a photographic image to a photograph printing facility located in or near a geographic region remote from the self-service digital photograph processing station, but near an intended recipient of the photographic image. The method includes entering at least a portion of the intended recipients telephone number, which may include the area code and exchange number. An augmented map is displayed showing a map of the geographic area that corresponds with the area code and exchange number, and one or more available photograph printing facilities superimposed on the map. One or more of the available photograph printing facilities are selected and sent the data representative of the photographic image. The intended recipient may then pick up the photograph image after it is printed by the selected photograph printing facility.

33 Claims, 3 Drawing Sheets

METHOD OF SENDING A PHOTOGRAPH ELECTRONICALLY FROM A SELF-SERVICE DIGITAL PHOTOGRAPH PROCESSING STATION TO A REMOTE PRINTING FACILITY

CROSS-REFERENCE TO RELATED APPLICATIONS

This application claims the benefit of U.S. Provisional Patent Application No. 60/820,852, filed on Jul. 31, 2006.

BACKGROUND OF THE INVENTION

The present invention relates to sending data representative of a photographic image from a self-service digital photograph processing station, such as a photo kiosk, to a remote printing facility. More particularly, the present invention relates to sending data representative of a photographic image from a self-service digital photograph processing station to a remote printing facility identified using at least a portion of a telephone number of an intended recipient of the photographs.

Many mass market digital photography customers neither have access to a computer connected to the internet, nor have access to a wide bandwidth internet connection. Further, these customers are not able to load digital photographs from a digital camera into a computer and do not have the necessary internet skills to easily transfer photographs to out-of-town relatives. However, they do have the desire to quickly and easily share family photographs with other family members who live in other geographic locations.

Mass market photo retailers, including discount chains, offer in-store digital printing machines, which may be self-service digital photograph processing stations which may be located on a store counter or may be in a photo kiosk. Such stores also are interconnected through high speed networks to the internet and therefore can offer transmission of data representative of a photographic image to a remote store that can then print the photograph so that it can be picked up by an intended recipient, such as a family member.

A major obstacle to this type of service is identifying a store location that the family member can pick up the photograph. Normally users, and therefore retailers, want simple "touch screen" user interfaces for these self-service digital photograph processing stations since full user interfaces tend to slow user progress and are too complicated for most users. While mass market photo retailer web sites usually use ZIP code or city, state searches to locate retail stores, such a method is not easily implemented on a self-service digital photograph processing station since the user interfaces on station normally do not offer mouse or keyboard driven searches. In addition, when users are in a retail location, they may not know the ZIP code or address of the family member that is to receive the photograph. Therefore, these self-service digital photograph processing station users are not able to easily send photographs to people in locations remote from the self-service digital photograph processing station.

What is needed is a method for allowing a self-service digital photograph processing station user to more easily select a photograph printing facility that is located in a convenient location relative to the intended recipient of the photograph.

BRIEF SUMMARY OF THE INVENTION

Briefly described in one aspect of the present invention, a method for electronically providing data representative of a photographic image to a remote printing facility from a self-service digital photograph processing station. The method includes receiving the data representative of the photographic image into the self-service digital photograph processing station, receiving at least a portion of a telephone number of an intended recipient of the photographic image into the self-service digital photograph processing station, displaying an augmented map including a map of a region corresponding to the at least a portion of the telephone number and at least one symbol representative of at least one available remote printing facility, and sending the data representative of the photographic image to at least one of the available remote printing facilities.

Another aspect of the present invention includes an electronic photograph transmittal system for a self-service digital photograph processing station. The self-service digital photograph processing station includes a data processor, and a photographic image input device coupled to the data processor for inputting data representative of a photographic image into the self-service digital photograph processing station. A first input device is coupled to the data processor for entering at least a portion of a telephone number of an intended recipient. A display is coupled to the data processor for displaying a region corresponding to the at least a portion of the telephone number and at least one printing facility. A second input device is coupled to the data processor for selecting at least one of the printing facilities displayed on the display. Further, a communication terminal is coupled to the data processor for transmitting the data representative of the photographic image to the at least one selected printing facility.

A further aspect of the present invention includes a computer-readable medium having computer-executable instructions for performing a method comprising: allowing the data representative of the photographic image to be transferred into the self-service digital photograph processing station, allowing at least a portion of a telephone number of an intended recipient of the photographic image to be transmitted into the self-service digital photograph processing station, displaying an augmented map including a map of a region corresponding to the at least a portion of the telephone number and at least one symbol representative of at least one available remote printing facility within the region; and allowing the data representative of the photographic image to at least one of the available remote printing facilities.

BRIEF DESCRIPTION OF THE SEVERAL VIEWS OF THE DRAWINGS

The accompanying drawings, which are incorporated into and form a part of the specification, illustrate the aspects of the present invention and, together with the description, serve to explain the principles of the invention. The drawings are only for the purpose of illustrating the aspects of the invention and are not to be construed as limiting the invention.

Corresponding reference characters indicate corresponding parts throughout the several views. The exemplifications set out herein illustrate the aspects of the invention, and such exemplifications are not to be construed as limiting the scope of the invention in any manner.

DETAILED DESCRIPTION OF THE INVENTION

Figure 1:
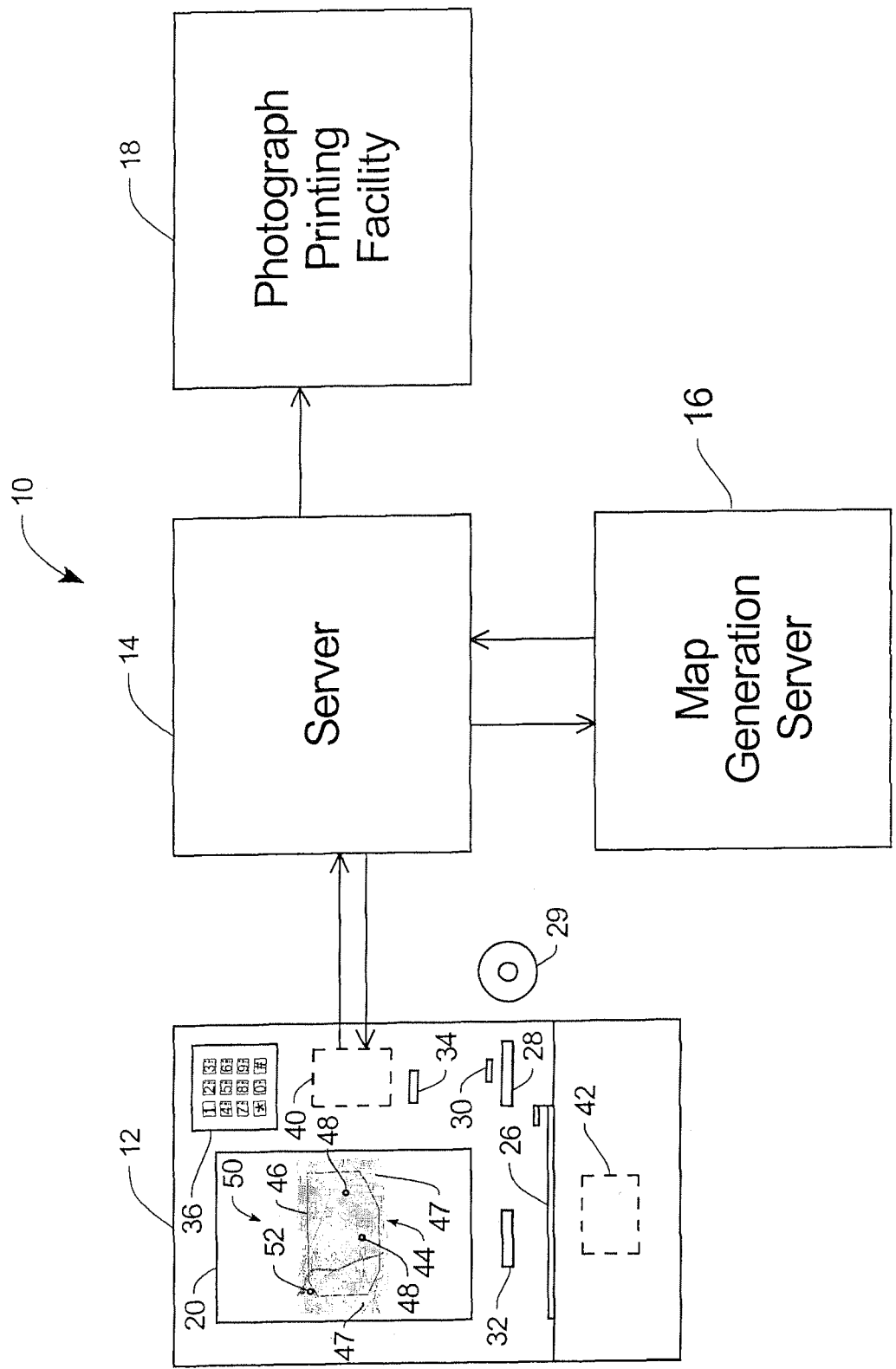
FIG. 1 is a block diagram of a system for electronically sending a photograph from a self-service digital photograph processing station according to an aspect of the present invention.

Turning now to the drawings, FIG. 1 is a block diagram 10 of a system and method for electronically providing data representative of a photographic image to a remote photograph printing facility from a self-service digital photograph processing station 12, for example a kiosk, according to an aspect of the present invention. The self-service digital photograph processing station 12 (hereinafter "station") has a connection to a server 14 that may be, for example, the store server where the station 12 is located, a server of a company that owns the station 12, or a photographic processing company server. Connected to the server 14 is a map generation server 16, and a photograph printing facility 18. It will be understood that server 14, map generation server 16 and photograph printing facility 18 may be situated in one location or in different locations. The connections shown in the drawings can be wired, wireless, or any combination thereof, and may be through the internet.

The station 12 may have a monitor screen or touch display screen 20. A scanner 26 for scanning photographs, a CD reader 28 for reading a CD 29 such as a photo CD or a CD with computer data or executable instructions, and a flash memory reader 30 may be used to input data representative of a photographic image into the station 12. Photographs that are printed in the station 12 may be ejected through a slot 32, and a payment slip is ejected from a payment slot 34. A keypad 36 may be located on the station 12 as shown in FIG. 1, or a keypad 38 may be displayed on the touch display screen 20 as shown in FIG. 2A. The station 12 has a wide area network (WAN) and/or an internet terminal 40 for communication with the server 14. A data processor 42 controls the operation of the station 12.

In the following discussion, while only one photograph printing facility may be referred to, it should be understood that the following discussion applies equally to other selected remote photograph printing facilities.

In operation, the method allows a user to load data representative of a photographic image into the station 12 using either the scanner 26, the CD reader 28, or the flash memory reader 30. Once the data representative of the photographic image is received by the station 12, the user may view the one or more pictures represented by the photographic data on the touch display screen 20 to select which photograph or photographs to send to an intended recipient, such as a family member, at a location remote from the station 12. Using the keypad 36 or 38, the user may then enter either the entire telephone number, or at least a portion of the telephone number, of the intended recipient of the one or more photographs. For example, a portion of the intended recipient's telephone number that may be received by the station 12 may include the area code and exchange number.

If the entire telephone number of the intended recipient is received by the station 12, then the telephone number may be parsed by either the station 12, the server 14, or the map generation server 16 to identify the geographical region corresponding to the area code and exchange portions of the telephone number. If, for example, only the area code and exchange number is received by the station 12, then the aforementioned parsing may not be necessary.

The method then uses the geographic region identified from the area code and exchange portions of the telephone number to create a map 44 using the map generation server 16, which includes the specified geographic region 46 associated with the entered telephone number, or area code and exchange number, and an outlying region 47 boarding on the specified geographic region 46. The server 14 contains a database including a list of photographic printing facilities and their respective geographic locations. Therefore, the server 14 may search the database to identify the available photograph printing facilities 48, 52 located in or near the geographic region that are associated with the entered telephone number, or area code and exchange number. The one or more photograph printing facilities 48 located within the specified geographic region 46 are superimposed or otherwise identified on the map 44, as shown in FIG. 2B, to produce an augmented map 50. The augmented map 50 includes the map 44 and the available photograph printing facilities 48 within the geographic region specified by the at least a portion of the entered telephone number. Each of the available photograph printing facilities may be represented by a symbol, such as a shape, number, letter, or other type of character.

The augmented map 50 also may show one or more photograph printing facilities 52 located outside of the specified geographical region 46 since the intended recipient of the photograph(s) may be located near the border of the specified geographic region 46, and the closest photograph printing facility 52 may be outside the geographic region 46. The size of the region boarding the specified geographic region 46 may be a predetermined minimum distance 54 measured from the perimeter of the geographic region 46 and/or may be selected based on the number of photographic printing facilities within the specified geographic region 46. For example, if there are no photographic printing facilities in the specified geographic region 46, the map 44 may be of an area large enough to include at least one photograph printing facility 52.

The augmented map 50 may be displayed on the touch display screen 20, wherein the user can examine the augmented map 50 to select one of the displayed photograph printing facilities 48, 52 by touching the touch display screen 20 at one of the symbols representing the photograph printing facility selected for printing the photograph. In an alternative aspect to the display on the touch display screen 20 shown in FIG. 1, an area map 56 may be displayed showing an enlargement of a region selected on the map 44 by a user. The user may select the area map 56 by touching the map 44 on the touch display screen 20 at a desired location. A rectangle 58 or other shape may be superimposed on the map 44 showing the location of the area map 56. The name, address, and telephone number 60 of a photograph printing facility 48, 52 which is located in the area map 56 may also be shown on the touch display screen 20. The area map 56 may show street names to aid a user in identifying the location of the intended recipient of the photograph(s). In this way, a user who has a general idea of the intended recipient's location or who wants to use a particular photograph printing facility is aided in finding an appropriate printing facility.

Figure 2C:
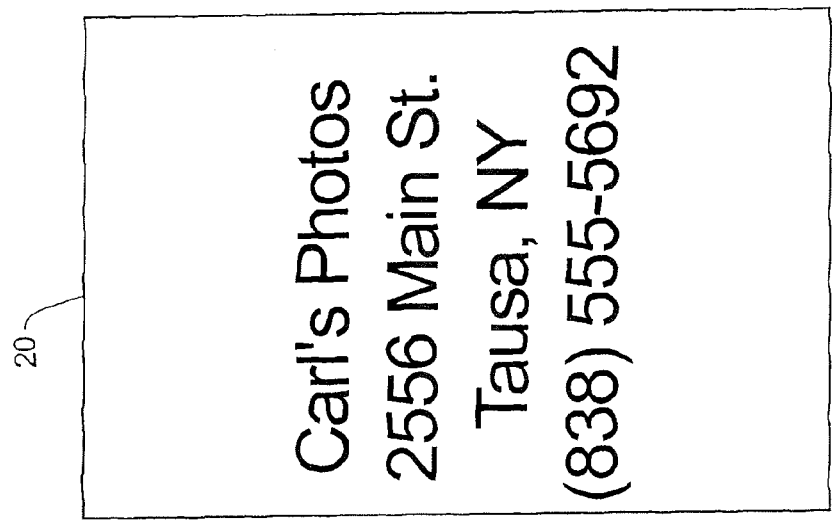
FIG. 2C shows a selected photograph printing facility's address and telephone number on the monitor screen for a photograph printing facility identified on the map shown in FIG. 2B.
Figure 2B:
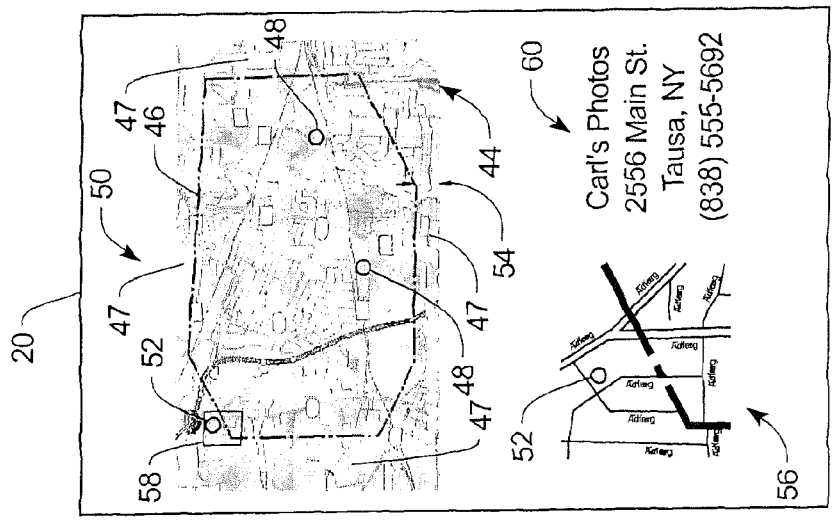
FIG. 2B shows a map with photograph printing facilities superimposed on a monitor screen on the self-service digital photograph processing station shown in FIG. 1.
Figure 2A:
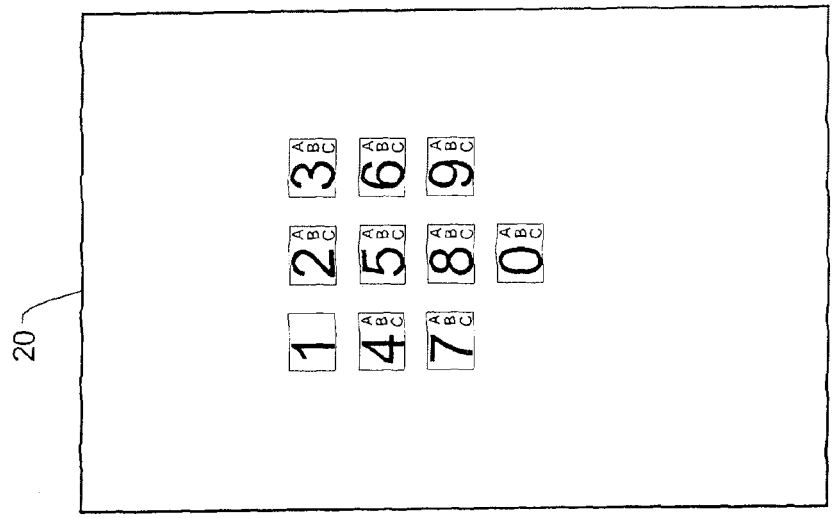
FIG. 2A shows a keypad on the monitor screen as an alternative to the keypad shown in FIG. 1.

The touch display screen 20 may then show the name, address and telephone number of the selected photograph printing facility as shown in FIG. 2C in one aspect of the invention.

In some circumstances, only one photograph printing facility could be in or near a specific geographic region associated with an entered telephone number, including the area code and exchange. In this instance, the user would only have one available choice for selecting which photograph printing facility will receive the data representative of the photographic image from the station 12. Furthermore, if there is only one available photograph printing facility, then the station 12 could automatically select that photograph printing facility and ask the user to confirm that the user would like to send the data representative of the photographic image to that photograph printing facility. In other circumstances, there may be more than one available photograph printing facility to choose from within the specified geographic region. In this instance, it will be understood that the user may select more than one of the available photograph printing facilities 48, 52 so the data representative of the photographic image is sent to multiple remote photograph printing facilities 48, 52.

Once the user has selected one or more of the available photograph printing facilities 48, 52, the data representative of the photographic image may be sent to the selected photograph printing facility 48, 52. The telephone number of the intended recipient may also be sent to the selected photograph printing facility through one or more of internet or wide area network connections. The selected photograph printing facility may use the telephone number previously entered by the user to notify the intended recipient when the photographs are ready to be picked up, or to call the intended recipient if the photographs have not been picked up within a certain period of time.

The user of the station 12 may receive a payment slip for using the station 12, and, optionally for the cost of printing the photographs at the selected photograph printing facility. The name, address, and telephone number of the selected photograph printing facility could also be printed and made available to the user at the payment slot 34 for future reference.

Figure 3:
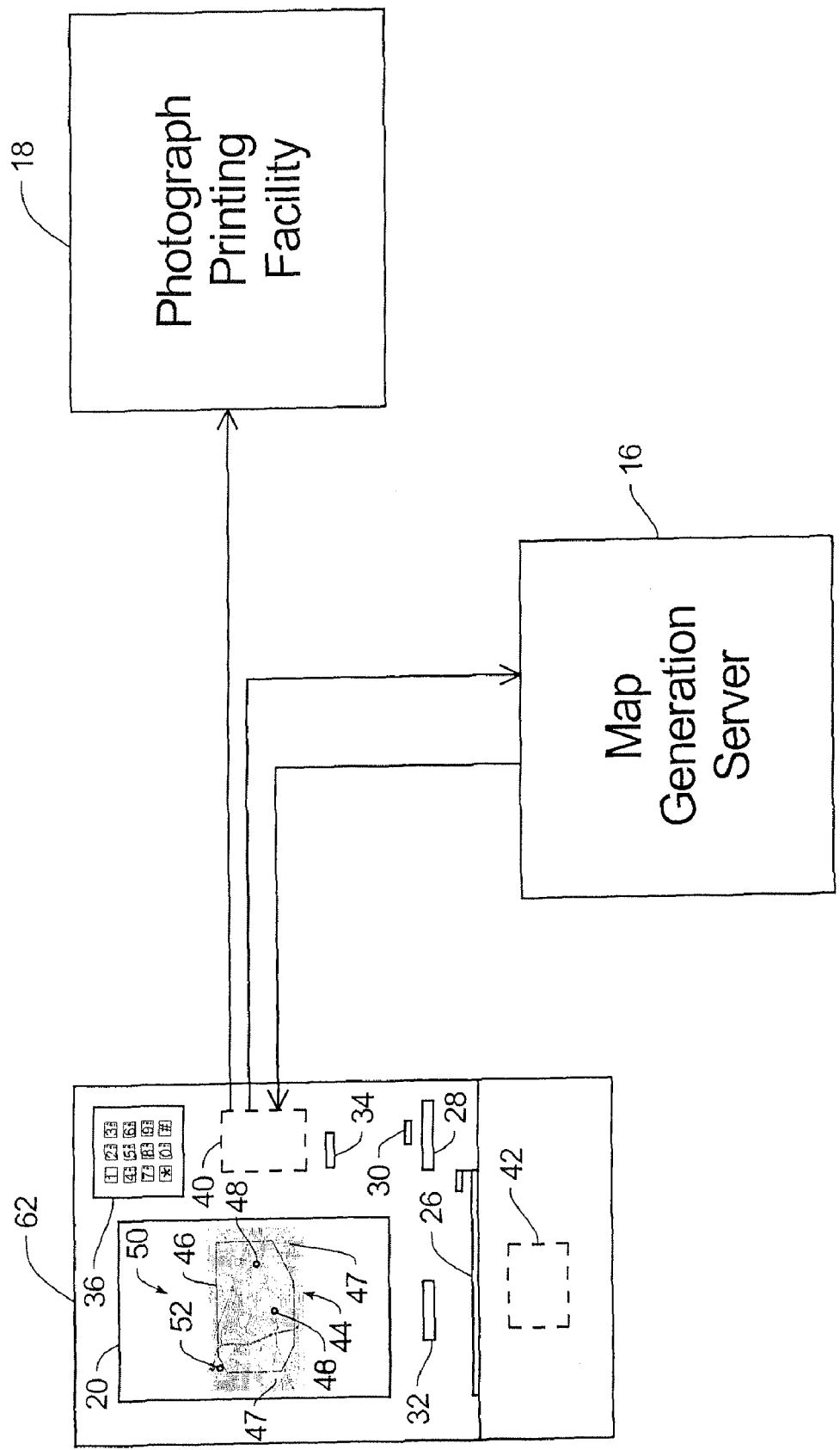
FIG. 3 is a block diagram of an alternative aspect of a system for electronically sending a photograph from a self-service digital photograph processing station.

FIG. 3 is another aspect of the present invention in which a station 62 has its own server and the previously mentioned server 14 is not used. The map generation server 16 and the remote photograph printing facility 18 are connected directly to the WAN and/or internet terminal 40 in the station 62.

In alternate aspects of FIGS. 1 and 3, a complete set of maps 44 may be transferred to the server 14 in FIG. 1, or the station 12 in FIG. 3, as updates are made to the maps 44. In these alternative aspects, there would not necessarily have to be an electrical connection from the station 12 to the map generation server 16, since updates could be on a CD, for example, which could be loaded into the station 12 using the Photo CD reader 28 in the drawing shown in FIG. 3.

The present invention therefore provides a convenient method to electronically send data representative of photographic images using a station to a remote photograph printing facility located in a geographic location near an intended recipient, such as a family member. The user only needs the intended recipients telephone number, of a portion thereof including the area code and exchange number to locate available photograph printing facilities in the geographic region near the intended recipient.

It will be understood and appreciated that the method for electronically providing data representative of a photographic image to a remote photograph printing facility as described above may be accessible to and executed by the system 10 in accordance with pre-programmed algorithms, execution instructions or sequences, computations, software code modules interface specifications or the like. Further, the method performed by the system 10 may be implemented in a computing environment such as a self service digital photograph processing station, a personal computer (PC) or other computing device. Such computer may also include a storage device including volatile and nonvolatile, removable and non-removable storage media implemented in any method or technology for storing information such as program modules, data structures, computer readable instructions, or other data.

The computer storage media may include, but is not limited to, floppy disks, conventional hard disks, read only memory (ROM), random access memory (RAM), flash memory, electrically erasable programmable read-only memory (EEPROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by the system 10.

The aspects described are to provide an illustration of principles of the invention and its practical application to enable thereby one of ordinary skill in the art to utilize the invention in various aspects and with various modifications as are suitable to the particular use contemplated. Therefore, the foregoing description is to be considered exemplary, rather than limiting, and the true scope of the invention is that described in the following claims.

What is claimed is:

1. A method for electronically providing data representative of a photographic image to a remote printing facility from a self-service digital photograph processing station, the method comprising:
 a) receiving the data representative of the photographic image into the self-service digital photograph processing station;
 b) receiving at least a portion of a telephone number of an intended recipient of a print of the photographic image into the self-service digital photograph processing station;
 c) displaying an augmented map including a map of a region corresponding to the at least a portion of the telephone number and at least one symbol representative of at least one available remote printing facility, wherein the augmented map includes a border region surrounding the region corresponding to the at least a portion of the telephone number, wherein a width of the border region is selected based on the number of available remote printing facilities displayed within the region corresponding to the at least a portion of the telephone number, and wherein when there are no remote printing facilities available within said region corresponding to said portion of the telephone number, the augmented map is dynamically adjusted to an area large enough to include at least one available remote printing facility;
 d) providing for the selection of at least one of the displayed available remote printing facilities; and
 e) sending the data representative of the photographic image to the selected at least one available remote printing facilities.

2. The method according to claim 1 further including receiving a selection by a user of the self-service digital photograph processing station designating the at least one of the available remote printing facilities.

3. The method according to claim 1 wherein the map is received from a map generation server that is at a location physically separated from the self-service digital photograph processing station.

4. The method according to claim 3 wherein the map is received from the map generation server in response to receiving the at least a portion of the telephone number.

5. The method set forth in claim 3 wherein the map is received prior to receiving the at least a portion of the telephone number.

6. The method set forth in claim 1 wherein the at least a portion of the telephone number is entered using a keypad.

7. The method set forth in claim 6 wherein the keypad is displayed on a screen on the self-service digital photograph processing station.

8. The method set forth in claim 1 wherein the at least a portion of the telephone number includes an area code and an exchange number associated with the intended recipient.

9. The method according to claim 1 wherein the border region includes at least one available remote printing facility.

10. The method according to claim 1 further including displaying an enlargement of a region of the augmented map.

11. The method according to claim 10 further including displaying information about an available printing facility represented by a symbol representative of the available remote printing facility.

12. The method according to claim 1 wherein the border region has a predetermined minimum width.

13. The method according to claim 1 wherein the self-service digital photograph processing station is a kiosk.

14. The method according to claim 1, further comprising:
   f) sending a first notification to the intended recipient from at least one of the selected at least one available remote printing facilities using the telephone number of the intended recipient when prints of the photographic images are ready to be picked up at the at least one of the selected at least one available remote printing facilities; and
   g) sending a second notification to the intended recipient from at least one of the selected at least one available remote printing facilities using the telephone number of the intended recipient when the prints of the photographic images have remained at the at least one of the selected at least one available remote printing facilities beyond a predetermined period of time.

15. An electronic photograph transmittal system for a self-service digital photograph processing station, the self-service digital photograph processing station comprising:
   a) a data processor;
   b) a photographic image input device coupled to the data processor for inputting data representative of a photographic image into the self-service digital photograph processing station;
   c) a first input device coupled to the data processor for entering at least a portion of a telephone number of an intended recipient of a print of the photographic image;
   d) a display coupled to the data processor for displaying an augmented map including a specified geographic region and a border region, wherein the specified geographic region corresponds to the at least a portion of the telephone number with the location of at least one printing facility identified within the specified geographic region, wherein the border region surrounds the specified geographic region and is configured for displaying at least one printing facility, wherein a width of the border region is based on the number of printing facilities identified within the specified geographic region, and wherein in the event that no printing facility can be located within the specified geographic region, said geographic region and the width of the border region are expanded until at least one printing facility can be included and shown;
   e) a second input device coupled to the data processor for selecting at least one of the printing facilities displayed on the display; and
   f) a communication terminal coupled to the data processor for transmitting the data representative of the photographic image to the at least one selected printing facility.

16. The electronic photograph transmittal system according to claim 15 wherein the first input device is a keypad.

17. The electronic photograph transmittal system according to claim 15 wherein the first input device is a virtual keypad shown on the display.

18. The electronic photograph transmittal system according to claim 15 wherein the first input device is the same as the second input device.

19. The electronic photograph transmittal system according to claim 15 wherein the communication terminal is a wide area network terminal.

20. The electronic photograph transmittal system according to claim 15 wherein the communication terminal is an internet terminal.

21. The electronic photograph transmittal system according to claim 15 wherein the self-service digital photograph processing station is a kiosk.

22. The electronic photograph transmittal system according to claim 15, further comprising:
   computer executable instructions configured to provide a first notification to the intended recipient from at least one of the selected printing facilities using the telephone number of the intended recipient when prints of the photographic images are ready to be picked up at the at least one of the selected printing facilities, and provide a second notification to the intended recipient from at least one of the selected printing facilities using the telephone number of the intended recipient when the prints of the photographic images have remained at the at least one of the selected printing facilities beyond a predetermined period of time.

23. A method for electronically providing data representative of a photographic image to a remote printing facility, the method comprising:
   a) providing from a computing device or a non-transitory computer readable medium the data representative of the photographic image to a self-service digital photograph processing station;
   b) providing at least a portion of a telephone number of an intended recipient of a print of the photographic image to the self-service digital photograph processing station;
   c) displaying on a user interface an augmented map including a map of a region corresponding to the at least a portion of the telephone number and at least one symbol representative of at least one available remote printing facility within the region, wherein the augmented map includes a border region surrounding the region corresponding to the at least a portion of the telephone number, wherein a width of the border region is selected based on the number of available remote printing facilities displayed within the region corresponding to the at least a portion of the telephone number, and wherein in the event that no printing facility can be located within the specified geographic region, said geographic region and the width of the border region is expanded until at least one remote printing facility can be included and shown;
   d) providing for the selection of at least one of the displayed available remote printing facilities; and
   e) providing the data representative of the photographic image to the selected at least one available remote printing facilities.

24. The method according to claim 23 further including enabling at least one of the displayed available remote printing facilities to be selected by a user of the self-service digital photograph processing station.

25. The method according to claim 23 further comprising providing the map from a map generation server that is at a location physically separated from the self-service digital photograph processing station.

26. The method according to claim 25 wherein the map is received from the map generation server in response to receiving the at least a portion of the telephone number.

27. The method set forth in claim 25 wherein the map is received prior to receiving the at least a portion of the telephone number.

28. The method set forth in claim 27 wherein the at least a portion of the telephone number is transmitted using a keypad.

29. The method set forth in claim 28 wherein the keypad is displayed on a screen on the self-service digital photograph processing station.

30. The method set forth in claim 23 wherein the at least a portion of the telephone number includes an area code and an exchange number associated with the intended recipient.

31. The method set forth in claim 23 wherein the self-service digital photograph processing station is a kiosk.

32. A non-transitory computer-readable medium having computer-executable instructions for performing a method comprising:

a) providing from a computing device or a non-transitory computer readable medium the data representative of a photographic image to a self-service digital photograph processing station;
b) providing at least a portion of a telephone number of an intended recipient of a print of the photographic image to the self-service digital photograph processing station;
c) displaying on a user interface an augmented map including a map of a region corresponding to the at least a portion of the telephone number and at least one symbol representative of at least one available remote printing facility, wherein the augmented map includes a border region surrounding the region corresponding to the at least a portion of the telephone number, wherein a width of the border region is selected based on the number of available remote printing facilities displayed within the region corresponding to the at least a portion of the telephone number, and wherein in the event that no printing facility can be located within the specified geographic region, said geographic region and the width of the border region are expanded until at least one printing facility can be included and shown therein;
d) providing for the selection of at least one of the displayed available remote printing facilities; and
e) providing the data representative of the photographic image to at least one of the available remote printing facilities.

33. The non-transitory computer-readable medium according to claim 32 wherein the self-service digital photograph processing station is a kiosk.

* * * * *